United States Patent [19]

Weigl

[11] Patent Number: 4,848,804
[45] Date of Patent: Jul. 18, 1989

[54] DIELECTRIC COUPLING

[75] Inventor: Jeffrey L. Weigl, Northfield Center, Ohio

[73] Assignee: Cajon Company, Macedonia, Ohio

[21] Appl. No.: 34,797

[22] Filed: Apr. 3, 1987

[51] Int. Cl.[4] .............................................. F16L 59/00
[52] U.S. Cl. ...................................... 285/52; 285/354
[58] Field of Search ................. 285/52, 51, 50, 54, 285/53, 353, 354, 334.5, 48, 334.1

[56] References Cited

U.S. PATENT DOCUMENTS

| | | | |
|---|---|---|---|
| 997,087 | 7/1911 | Peeples | 285/54 X |
| 2,269,664 | 1/1942 | Hallerberg | 285/416 X |
| 2,409,283 | 10/1946 | Hudson | 285/115 |
| 2,561,648 | 7/1951 | Bradley | 285/122 |
| 2,726,101 | 12/1955 | Peterson | 285/16 |
| 2,837,351 | 6/1958 | Bailey | 285/52 |
| 3,018,119 | 1/1962 | Champion | 285/52 |
| 3,115,354 | 12/1963 | Bowan et al. | 285/52 |
| 3,185,501 | 5/1965 | Bowan et al. | 285/52 |
| 3,346,274 | 10/1967 | Baron | 285/52 |
| 3,355,191 | 11/1967 | Tzschirntsch | 285/52 |
| 3,408,093 | 10/1968 | Epstein | 285/52 |
| 3,764,169 | 10/1973 | St. Clair | 285/52 |
| 3,807,773 | 4/1974 | Brune | 285/52 |
| 3,865,413 | 2/1975 | Mizusawa et al. | 285/334.5 X |
| 3,891,251 | 6/1975 | Richter, Jr. | 285/338 |
| 4,595,218 | 6/1986 | Carr et al. | 285/47 |
| 4,693,502 | 9/1987 | Oetiker | 285/334.5 |

FOREIGN PATENT DOCUMENTS

| | | | |
|---|---|---|---|
| 103968 | 5/1938 | Australia | 285/52 |
| 1237860 | 6/1960 | France | 285/52 |
| 7603410 | 10/1977 | Netherlands . | |
| 152390 | 11/1955 | Sweden . | |
| 320231 | 2/1970 | Sweden | 285/52 |
| 542208 | 12/1941 | United Kingdom | 285/50 |

Primary Examiner—Thomas F. Callaghan
Attorney, Agent, or Firm—Fay, Sharpe, Beall, Fagan, Minnich & McKee

[57] ABSTRACT

A dielectric tube coupling includes a tube-like body having a circumferential ramp on the exterior periphery thereof. Opposed, non-conductive flared sleeves are disposed in surrounding relationship with the body so that the flared portions thereof closely engage opposite faces of the ramp. A threaded connector surrounds one of the sleeves and has an angled internal portion thereof in exteriorly abutting relation with the flared portion of the sleeve. The connector threadedly receives a coupling which includes an internal angled shoulder disposed in exteriorly engaging relation with the flared portion of the other sleeve. The tube-like body has one end sealingly disposed by means of an O-ring and a back-up washer in a seat included in the connector.

7 Claims, 1 Drawing Sheet

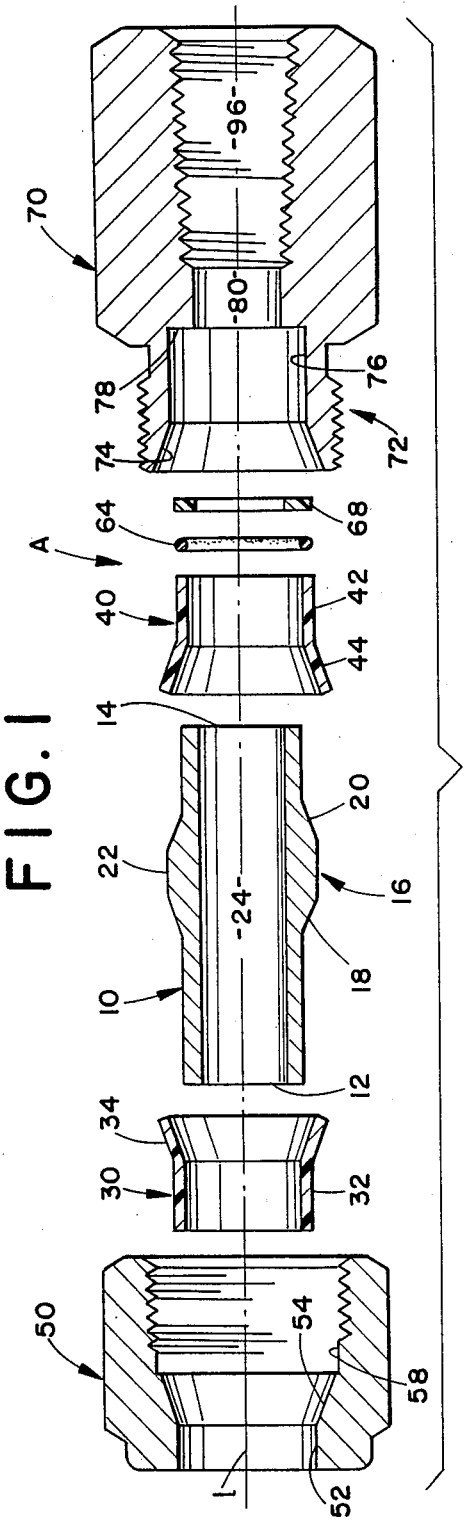
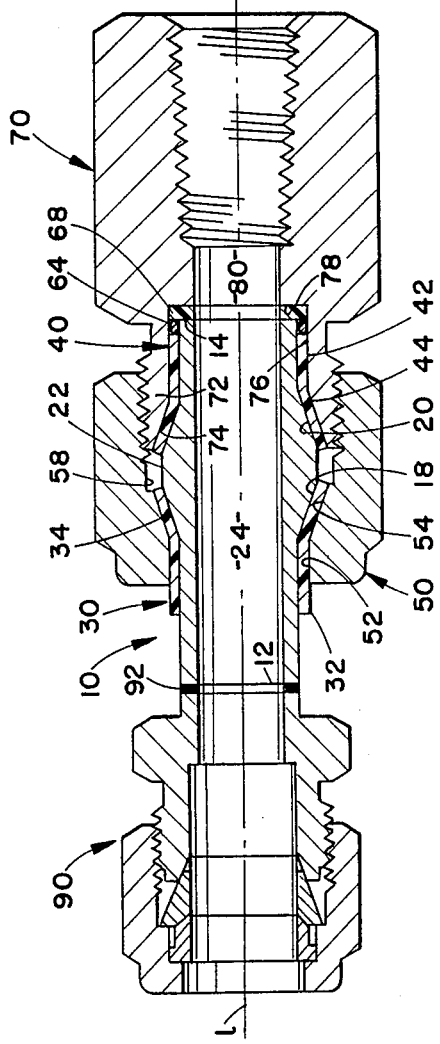

DIELECTRIC COUPLING

BACKGROUND OF THE INVENTION

This invention pertains to the art of fluid fittings and, more particularly, to fluid couplings.

The invention is particularly applicable to a dielectric tube coupling in which it is imperative that electrical conduction through the coupling be impaired, and will be described with particular reference thereto. However, it will be appreciated by those skilled in the art that the invention has broader applications and uses. One such alternative use, for example, would be in the prevention of galvanic corrosion as may occur when a union between two dissimilar metals is required.

It is often necessary or desirable to connect or couple electrically conductive fluid lines or tubes while concurrently restricting electrical conduction through the coupling itself. Applications for a dielectric coupling ar oftentimes present for isolating fluid lines used to transport flammable media.

Another application for a dielectric coupling resides in the prevention of galvanic corrosion, such as occurs when two dissimilar metals are brought into electrical contact. Galvanic corrosion may occur, for example, if copper tubing such as is typically used to transport water is brought into electrical contact with a steel tank of the type used in many water vessels.

Prior dielectric couplings have generally included the use of sleeves, O-rings, non-conducting washers, or combinations thereof in a manner where a fluid seal is at least partially effected by a dielectric material. These materials are typically subjected to longitudinal compression which may cause buckling, or to compressinal forces which may cause the material to crumble or crack. Prior art fittings can lose a seal of internal media when the dielectric material loses compression as may occur by repeated opening or tightening of the coupling. Limitations in the dielectric material itself may further place limits on the line pressure which may be maintained.

The present invention contemplates a new and improved dielectric coupling which overcomes all of the above-referred problems and others, and provides a simple and more reliable dielectric coupling arrangement.

SUMMARY OF THE INVENTION

In accordance with the present invention, a new and improved dielectric coupling is advantageously provided which is extremely effective in use and which subjects the dielectric material to both shear and compression forces.

According to the invention, the tube coupling includes an elongated hollow body having first and second spaced apart ends. An exterior ramp extends peripherally of the body intermediate the ends, and the ramp has opposed first and second walls angled from the body and terminating at an apex-like area. First and second sleeves are received on the body and are disposed in opposed relation to each other on opposite sides of said ramp. Each sleeve includes a flared portion receivable in substantially mating engagement with an associated one of said first and second walls. A coupling member is received on the body in surrounding relation with one of the sleeves and has a first angled rim coopeatively engaging the flared portion of the one sleeve. A connector is provided having a portion disposed in surrounding relation with the other sleeve. This connector includes a second angled rim in cooperative engagement with the flared portion of the other sleeve. Means for interconnecting the coupling member and connector facilitates selective adjustment of the longitudinal distance between the first and second angled rims. This capability allows the force which is applied to the flared portions of the first and second sleeves to be adjusted for urging the flared portions into mating engagement with the opposed walls of the ramp on the body.

According to another aspect of the invention, the tube coupling includes seal means interposed between a rear end face of the other sleeve and the connector. In the preferred embodiment, this seal means comprises an O-ring closely received on the body adjacent the associated one of the body first and second ends.

In accordance with another aspect of the invention, a back-up ring is interposed between the connector and the associated one of the body first and second ends.

In accordance with still another aspect of the invention, the connector includes a passage having a seat defined at an internal area thereof. The back-up ring is closely received against this seat.

According to a further aspect of the invention, the sleeves are comprised of a dielectric material for electrically isolating the connector from the body.

According to yet another aspect of the invention, the coupling member rim, the flared portion of the one sleeve, and the cooperable one of the ramp walls are constructed to have closely mating conformations. Likewise, the connector rim, the flared portion of the other sleeve, and the other of the ramp walls are constructed to have closely mating conformations.

The principal advantage of the subject invention is the provision of a more reliable dielectric coupling in which the seal is primarily indepoendent of the dielectric material used.

Another advantage of the invention is found in the fact that the integrity of the seal is not affected by fatiguing of the dielectric material.

A further advantage of the invention resides in an arrangement where the dielectric material is subject to both shear and compression forces to decrease the potential for encountering any fatiguing.

Further objects and advantages of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part thereof, and wherein:

FIG. 1 is an exploded cross-sectional view of a dielectric coupling formed in accordance with the present invention; and, FIG. 2 is a cross-sectional view of the subject new coupling in an assembled condition with a conventional tube fitting associated therewith.

DETAILED DESCRIPTION OF THE PREFERRED EMBODIMENT

Referring now to the drawings wherein the showing are for purposes of showing the preferred embodiment of the invention only and not for the purpose of limiting same, FIG. 1 is an exploded view of the new dielectric coupling A which is used to join the ends of opposed tubes, fluid lines, or tubing ends (not shown) at a fluid passage generally defined along a coupling longitudinal axis 1. A tube-like metal body 10 has opposed first and second ends 12, 14. A ramp or protuberance 16 extends circumferentially around body 10 and is defined by opposed first and second walls 18, 20. The walls converge toward each other and terminate at an apex-like area 22. In the preferred embodiment shown, area 22 comprises a thin, flat band extending circumferentially around body 10. It is to be appreciated however, that other conformations could be used for the apex-like area without in any way departing from the overall intent or scope of the invention. As will be seen in FIG. 1, body 10 is hollow and defines a fluid passageway 24 longitudinally therethrough.

A first flared sleeve 30 has a generally funnel-shape and is comprised of a first tubular portion 32 and a first frusto-connical forward end portion or flare 34. Sleeve 30 is constructed of a non-conductive dielectric polyamide-imide resin such as the product marketed by Amoco Chemicals Corp. under the trademark TORLON. For convenient description and ease of reference, angles are referenced in relation to longitudinal axis 1. The internal diameter of the tubular wall 32 is slightly greater than the outside diameter of the body 10, and the angle of divergance of forward end portion 34 from tubular potion 32 is chosen supplementary to the angle of the first wall 18 on body 10. A variety of supplementary angles may be satisfactorily employed to realize the advantage of stressing sleeve 30 in both shear and compression. Moreover, variations in shear stress in relation to compression stress may be effected by varying these angles. First sleeve 30 is adapted to be placed in close surrounding relation with body 10 from first end 12 thereof such that forward end portion 34 engages the first wall 18 of the ramp 16.

A second flared sleeve 40 is oppositely disposed from sleeve 30 and is comprised of a second tubular portion 42 and a second frusto-conical forward end portion or flare 44. In the preferred embodiment here under discussion, the first and second sleeves are identical to each other, and the second sleeve is cooperable with body 10 and wall 20 of ramp 16 in the same manner described above with reference to first sleeve 30. Preferably, second sleeve 40 is fabricated from the same material as the first sleeve. It will be appreciated, however, that it is not necessary for the two sleeves to be identical, and that there may be some applications where it may be desirable for the sleeves to have unlike dimensional characteristics. Such modifications do not in any way affect the overall scope or the intent of the subject invention.

A coupling nut 50 includes first passage portion 52 having a diameter which is slightly greater than the outside diameter of the first tubular portion 32 of sleeve 30 for close sliding receipt thereon. Passage portion 52 merges into an angled or tapered rim or shoulder 54. The angle of shoulder 54 is supplementary to the angle of first frusto-conical portion 34 on sleeve 30 and is generally equivalent thereto. Rim or shoulder 54 merges into an enlarged second passage 58 which includes female threads for assembling the coupling in a manner to be described. The diameter of the second passage portion is such that it may easily pass over apex-like area 22 of ramp 16. As will become apparent hereinafter, the coupling nut portion 52 and rim 54 are adapted to closely embrace first sleeve portion 32, 34 respectively.

A seal ring 64, which comprises a rubber O-ring in the preferred embodiment, is provided for cooperation with the tubular portion 42 of sleeve 40 and the tube-like body 10. The seal-ring aids in achieving a fluid sealing relationship between the components when the coupling is installed in a fluid system as will be described.

A back-up ring 68 is located adjacent seal-ring 64 at second end 14 of body 10. The outside diameter of back-up ring 68 is substantially the same as the outside diameter of tubular portion 42 of second sleeve 40. The inside diameter of the back-up ring is substantially equal to the diameter of passageway 24 through body 10. Preferably, the back-up ring is comprised of a plastic material such as polytetrafluorethylene or the like, although other materials also could be used.

A connector 70 has a main body portion having a longitudinal projection 72 at the forward end thereof. A passageway extends through connector 70 and includes a second angled or tapered rim or shoulder 74 that is generally supplementary to the angle of second frusto-conical portion 44 of sleeve 40. A straight passage portion 76 is dimensioned to closely slidably receive tubular portion 42 of the second sleeve 40, and has a length slightly greater than the length of portion 42. A radial seat or shoulder 78 disposed at the inner end of passage portion 76 has an outside diameter adapted to closely receive back-up ring 68 and an inside diameter substantially identical to the inside diameter of the ring. A second straight passage portion 80 communicates with the portion 76 at seat 78, and a conventionally threaded area 96 adapted to receive an associated fluid fitting communicates with passage portion 80.

FIG. 2 shows the above described components in their assembled condition. First sleeve 30 is placed in surrounding relation over body 10 from the first end 12 and advanced therealong until first flare 34 abuts against ramp first wall 18. Second sleeve 40 is placed in surrounding relation over body 10 from second end 14 thereof, and advanced therealong until second flare 44 abuts second ramp second wall 20. Because of the corresponding conformations decribed above, each flare will closely mate with its associated ramp wall. Seal-ring 64 is then placed on body 10 from end 14 and moved into abutting engagement with the rear end of second sleeve 40.

Back-up ring 68 is placed in passage portion 76 of connector 70 so that is abuts seat 78. Connector 79 may then be inserted over end 14 of body 10 toward the position shown in FIG. 2, and coupling nut 50 may be similarly assembled from end 12 of the body. The nut is threadedly advanced onto the connector at projection 72 thereof to complete assembly.

As the coupling nut is advanced onto the connector, rims 54, 74 engage flares 34, 44, respectively, to drive the sleeves toward each other and into close fitting engagement with walls 18, 20 of ramp 16. Because of the compatible conformations of the components as described above, substantially mating relationships will be achieved between rim 54, flare 34, and wall 18, and between rim 74, flare 44, and wall 20. At the same time, end 14 of body 10 is driven toward engagement with back-up ring 68, and seal-ring 64 is closely captured in fluid sealing relation between the outer end face of sleeve 40, ring 68, the outer surface of body 10, and passage portion 76.

When assembled as described above, dielectric isolation is present between the body 10 and projection 72 of connector 70. A fluid seal is formed between connector 70 and body 10 by squeezing or compressing seal ring 64 between passage portion 76 of the connector and the outer peripheral surface of the body. Hence, a seal is provided which is primarily independent of the dielectric material and, therefore, not subject to seal failure in the event the dielectric material loses compression. It is envisioned, however, that should the seal ring 64 fail, some secondary sealing may be provided by the dielectric material itself without any loss in the integrity of dielectric isolation. With such an assembly, a dielectric isolative potential in excess of 200 volts D.C. is provided, at which point the dielectric properties are lost due to insulator breakdown, arcing, or combinations thereof. Back-up ring 68 performs no sealing function and is merely provided to insulate body 10 from connector 70.

It will be seen in the FIGURES, primarily with regard to FIG. 2, that when fully assembled, the dielectric sleeves 30, 40 are subjected to forces in both shear and compression. The proportion of shear stress to compression stress may be varied by varying the angles of the flared sleeves 30, 40, and by correspondingly varying the angles of the flares 34, 44 and rims 54, 74.

FIG. 2 also illustrates a conventional non-dielectric connector assembly 90 which is secured to the first end 12 of body 10. The addition of such a connector accomodates easy installation of the subject new coupling into an existing fluid system. As illustrated, tube coupling assembly 90 is shown to have been affixed to end 12 by means of a full penetration butt weld 92 through use of known welding techniques and equipment. Similarly, a conventional tube connector (not shown) may be received by threaded portion 96 of connector 70. Portion 96 is shown as comprising conventional female pipe threads adapted to receive corresponding male threads. Such arrangement also facilitates ease of installation of the new coupling into a fluid system. It will be appreciated that other connector arrangements may be suitably employed without departing from the overall intent or scope of the invention.

This invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A tube coupling comprising:

an elongated hollow body having first and second spaced apart ends with an exterior ramp extending peripherally of said body intermediate and at a spaced distance from each of said ends, said ramp having first and second walls angled from said body and converging toward each other;

first and second flared dielectric sleeves, each flared dielectric sleeve having a generally cylindrical portion terminating at one end thereof in a flared portion with the cylindrical portions being closely, slidably received on said body, with the first and second flared dielectric sleeves being disposed in opposed facing relation to one another and in mating relation with said body, a first wall of said ramp engaging a flare on one of said flared sleeves and a second wall of said ramp engaging a flare on the other of said flared sleeves;

a coupling nut disposed in surrounding relation with one of said flared sleeves, and having a first angled rim thereof matingly engaging the flare of said one flared sleeve;

a connector having a portion thereof in surrounding relation with the other of said flared sleeves, said connector including a radially extending internal annular seat and a second angled rim matingly engaging the flare of said other flared sleeve;

an elastomeric back-up ring interposed between an end of said body and said seat; and, a seal ring interposed between an end of said other flared sleeve and said back-up ring.

2. The tube coupling of claim 1 wherein said seal ring comprises an O-ring closely received on said body adjacent one of said first and second ends.

3. The tube coupling of claim 1 wherein said body first end and said connector are adapted to be connected to conventional fluid fittings.

4. The tube coupling of claim 1 wherein said coupling member comprises a coupling nut having internal threads cooperable with an externally threaded portion of said connector.

5. The tube coupling of claim 1 wherein said first and second flared sleeves are substantially identical to each other.

6. The tube coupling of claim 1 wherein said sleeves are comprised of a dielectric material having a dielectric potential in excess of 200 volts D.C.

7. The tube coupling of claim 6 wherein the first wall of said ramp has an angle of slope supplementary to the angle of the flare on said one flared sleeve, and the second wall of said ramp has an angle of slope supplementary to the angle of the flare on said other flared sleeve.

* * * * *